Dec. 2, 1952     C. K. JUDD, JR     2,619,775
GLASS CUTTING BOARD
Filed Oct. 1, 1949
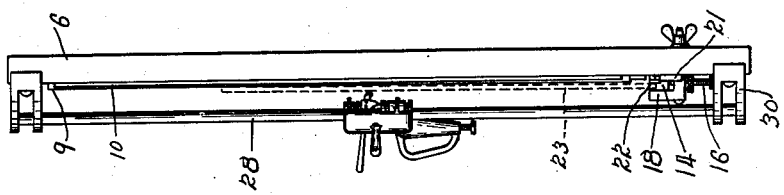
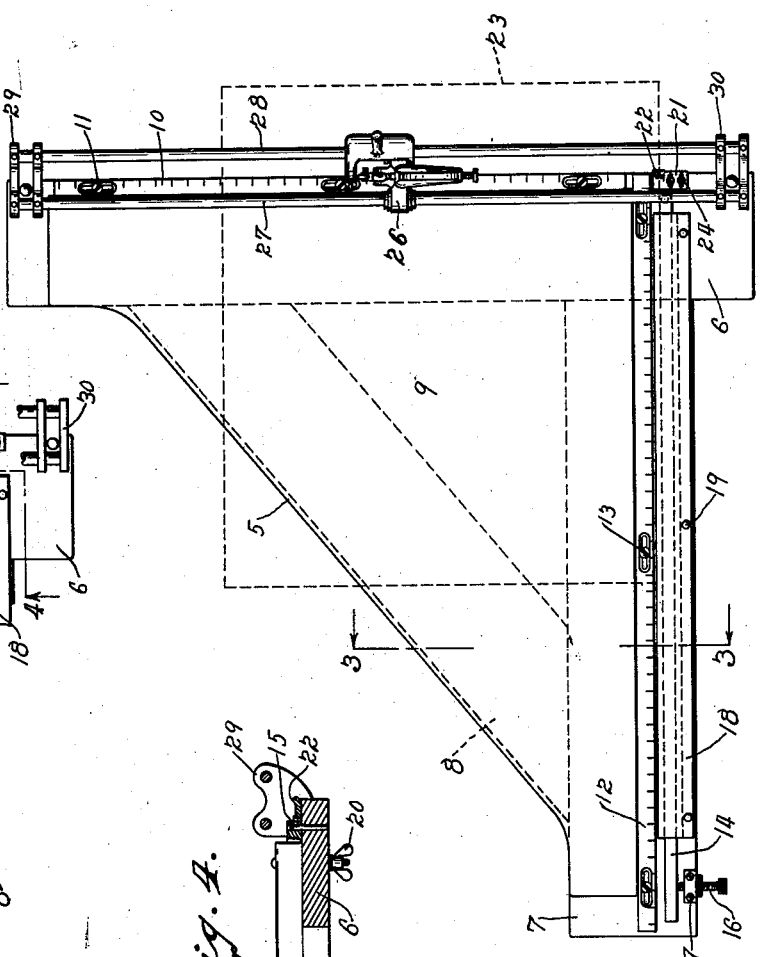
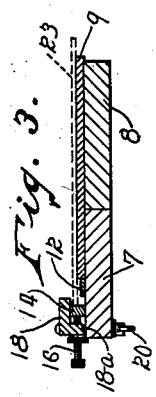
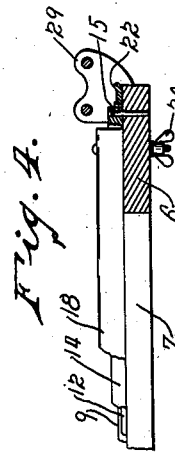
INVENTOR.
CHESTER K. JUDD JR.
BY
Louis V. Lucia
ATTORNEY.

Patented Dec. 2, 1952

2,619,775

UNITED STATES PATENT OFFICE 2,619,775

GLASS CUTTING BOARD

Chester K. Judd, Jr., Bristol, Conn., assignor to The Fletcher-Terry Company, Forestville, Conn., a corporation of Connecticut Application October 1, 1949, Serial No. 119,073

5 Claims. (Cl. 49—48)

This invention relates to a glass cutting board and more particularly to a device such as shown and described in my copending application, Serial No. 33,350, filed June 16, 1948, now Patent No. 2,534,775.

Glass cutting boards, such as heretofore used, have not been entirely satisfactory for the reason that they often failed to maintain their accuracy for squareness, due to warping of the board frame or to impairment of the board by rough usage and other causes.

Trouble has also been experienced with such cutting boards in breaking the glass on the line of cut, when it was attempted to support the glass sheet under said line of cut for its full length, as such support could provide uneven contact with the glass sheet and cause the break to run off the line of cut, particularly when thin sheets of glass are cut.

In order to obtain a break on a true line along a line of cut, it is important, as well known among those skilled in the art, that the break in the glass be started from an end of the line of cut and allowed to run along said line, rather than to attempt to break the glass over a substantial portion of said line at one time.

It is an object of this invention, therefore, to provide a cutting board having novel and highly efficient means for causing breaking of the glass on a true line along the line of cut.

It is a further object of this invention to provide a glass cutting board which can be readily adjusted for accuracy and squareness.

It is a still further object to provide improved means for accurately measuring a glass sheet on said board.

Further objects and advantages of the invention will be more clearly understood from the following description and from the accompanying drawing in which:

Fig. 1 is a front view of a glass cutting board embodying my invention.

Fig. 2 is an edge view of said cutting board.

Fig. 3 is a sectional view on line 3—3 of Fig. 1.

Fig. 4 is a sectional view on line 4—4 of Fig. 5.

Fig. 5 is a fragmentary front view showing the lower portion of the board with the cutter supporting track removed therefrom.

As illustrated in the drawings, my improved cutting board preferably comprises a frame 5 which is constructed of a side member 6 and a bottom member 7 that are connected and retained in squared relation by means of a brace member 8 in said frame. There is mounted on said frame a suitable flat plate or sheet 9 providing a supporting surface for the glass sheets to be cut upon said board.

A measuring bar 10 is provided along the vertical edge of said board and is adjustably secured to the member 6 by means of screw and slot connections, indicated at 11, to permit vertical adjustment of said bar. A similar measuring bar 12 is provided along the lower edge of the board and similarly secured to the member 7 by the connections 13 to permit lateral adjustment of the bar on said board.

There is also provided, along the lower edge of the board, a positioning bar 14 which is pivotally mounted by one end thereof, as at 15, to the member 6 and extends along the lower edge of the board with its opposite end supported upon an adjusting screw 16 that is threaded to a suitable supporting post 17.

A guide bar 18, which is cross-sectionally L-shaped, is secured to the board, along the lower edge thereof, by fastening bolts 19 and extends in clamping position over the bar 14, as clearly illustrated in Fig. 3. The bottom edge of the shorter leg of the guide bar 18 is tapered away from the surface of the board and inwardly of the lower edge thereof as indicated at 18ª in Fig. 3 to permit the guide bar to rock toward the positioning bar 14 and clamp the said positioning bar against the surface of the board when the wing nuts 20 on the bolts 19 are tightened.

A breaker member 21, preferably consisting of a plate having an upwardly projecting edge portion 22, is mounted adjacent the lower edge of the board with the said edge portion extending slightly above and below the plane of the surface of the bar 14 upon which the sheet 23 of glass is supported, as clearly illustrated in Fig. 1. This breaker plate 21 is adjustably secured to the member 6 by screw and slot connections 24 to permit adjustment of the said plate so that the breaker edge portion may be positioned parallel relatively to the line of cut made by the cutting tool.

It will be noted that, by making the glass positioning bar 14 adjustable, I have provided means for readily squaring the positioning surface of said bar with the line of cut made by the glass cutting wheel on the head 26 so that square cuts may be made on the glass sheets.

It also will be noted that the measuring bars 10 and 12 are slightly thinner than the plate 9 and that the breaker edge is located on a plane slightly above the surface of the plate 9 so that when a sheet of glass, such as indicated in dotted lines at 23, is placed upon the surface of the sheet 9, the lower marginal portion may rest upon the breaker edge 22 to insure proper breaking of the glass and also prevent wear on said bars which would impair the visibility of the graduations thereon.

The said cutting board is provided with a pair of supporting bars 27—28 which are mounted by their ends in brackets 29 and 30 that are secured at the opposite ends of the board and provide a track for slidably supporting thereon a cutting head which will cut a sheet of glass on a line running along the perpendicular edge of the board and the measuring bar 10 thereon.

I claim:

1. A glass cutting board comprising a frame having a side edge substantially perpendicular to the lower edge, a positioning bar pivoted at one end to said frame and extending along one of said edges, means including an adjusting screw at the opposite end of said bar for adjusting it relatively to the other edge of the board; an L-shaped clamping bar extending along the lower edge of said board and having the inner surface of one side thereof adjacent the side of said positioning bar and the bottom edge of the other side adjacent said board; the said bottom edge being tapered away from the board which, when tightened, causes the said clamping bar to work on its tapered edge and towards the positioning bar to thereby securely clamp the said positioning bar in adjusted position.

2. A glass cutting board comprising a frame having a lower edge and a side edge substantially perpendicular to the lower edge, a positioning bar extending along said lower edge and adjustable relatively to the said side edge, a guide bar extending along the lower edge and secured to said board with a portion thereof overlying and extending beyond the said positioning bar, and means for clamping said portion against the positioning bar to secure said bar in adjusted position.

3. A glass cutting board as set forth in claim 2, wherein means is provided for guiding a glass cutting tool over said frame on a line of cut, a measuring bar extending along the said positioning bar and adjustable relatively to said line of cut, and a second measuring bar extending along said line of cut and adjustable relatively to said positioning bar.

4. A glass cutting board as set forth in claim 2, wherein means is mounted on said frame for guiding a glass cutting tool to form a line of cut on a sheet of glass resting upon said board, and a breaker member including a plate adjustably mounted on said board and having an upwardly projecting corner portion presenting an edge parallel with said line of cut and extending over only a portion thereof.

5. A glass cutting board as set forth in claim 2, wherein a lower face of the guide bar resting against said board is tapered inwardly whereby when said clamping means is applied said guide bar will rock inwardly and down to clamp said overlying portion firmly against said positioning bar.

CHESTER K. JUDD, Jr.

REFERENCES CITED

The following references are of record in the file of this patent:

UNITED STATES PATENTS

| Number | Name | Date |
|---|---|---|
| 453,867 | Monce | June 9, 1891 |
| 890,181 | Royle | June 9, 1908 |
| 1,115,333 | Pease | Oct. 27, 1914 |
| 1,117,736 | Whittemore | Nov. 17, 1914 |
| 1,649,282 | Bishop | Nov. 15, 1927 |
| 2,174,183 | Shaw | Sept. 26, 1939 |
| 2,174,469 | Levin | Sept. 26, 1939 |